(12) United States Patent
Shell et al.

(10) Patent No.: US 8,336,821 B2
(45) Date of Patent: Dec. 25, 2012

(54) SYSTEMS AND METHODS FOR CARGO COMPARTMENT AIR CONDITIONING USING RECIRCULATED AIR

(75) Inventors: Sidney D. Shell, Everett, WA (US);
Warren A. Atkey, Bothell, WA (US);
Michael Trent, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 2212 days.

(21) Appl. No.: 11/095,738

(22) Filed: Mar. 31, 2005

(65) Prior Publication Data
US 2006/0219842 A1 Oct. 5, 2006

(51) Int. Cl.
B64D 13/00 (2006.01)
B64D 13/06 (2006.01)
F28F 13/06 (2006.01)

(52) U.S. Cl. ........... 244/118.5; 454/76; 454/77; 165/42; 165/108

(58) Field of Classification Search ............... 244/118.5, 244/118.1; 454/70, 71, 72, 73, 74, 75, 76, 454/77; 165/41, 42, 43, 213, 108
See application file for complete search history.

(56) References Cited

U.S. PATENT DOCUMENTS

| | | | |
|---|---|---|---|
| 2,851,254 A | | 9/1958 | Messinger et al. |
| 3,199,578 A | | 8/1965 | Rogers |
| 4,262,495 A | | 4/1981 | Gupta et al. |
| 4,635,708 A | * | 1/1987 | Levine .......................... 165/238 |
| 5,036,678 A | | 8/1991 | Renninger et al. |
| 5,545,084 A | * | 8/1996 | Fischer et al. .................. 454/76 |
| 5,697,580 A | * | 12/1997 | Reinhardt .................. 244/118.5 |
| 5,701,755 A | | 12/1997 | Severson et al. |
| 5,704,218 A | | 1/1998 | Christians et al. |
| 5,988,565 A | * | 11/1999 | Thomas et al. ............. 244/118.1 |
| 6,024,639 A | * | 2/2000 | Scherer et al. ................... 454/77 |
| 6,216,981 B1 | * | 4/2001 | Helm .......................... 244/118.5 |
| 6,257,003 B1 | | 7/2001 | Hipsky |
| 6,306,032 B1 | * | 10/2001 | Scheffler et al. ................ 454/71 |
| 6,389,826 B2 | * | 5/2002 | Buchholz et al. ............... 62/172 |
| 6,401,473 B1 | | 6/2002 | Ng et al. |
| 6,449,963 B1 | | 9/2002 | Ng et al. |
| 6,526,775 B1 | | 3/2003 | Asfia et al. |
| 6,672,541 B2 | * | 1/2004 | Fieldson et al. ........... 244/118.5 |
| 6,681,591 B2 | | 1/2004 | Defrancesco et al. |
| 6,817,575 B1 | * | 11/2004 | Welch et al. ................ 244/118.5 |
| 2004/0172963 A1 | * | 9/2004 | Axe et al. ......................... 62/401 |
| 2005/0051668 A1 | | 3/2005 | Atkey et al. |

FOREIGN PATENT DOCUMENTS

DE 19936643 A1 2/2001

OTHER PUBLICATIONS

PCT International Search Report and Written Opinion for Application No. PCT/US2006/011200, dated Oct. 11, 2006, 12 pages.

* cited by examiner

Primary Examiner — Joseph W Sanderson

(57) ABSTRACT

The present invention comprises systems and methods for providing conditioned air to a selected portion of an aircraft cabin. In one embodiment, a system includes a cargo compartment air recirculation system fluidly coupled to the cargo compartment and having an air moving device to extract air from the compartment and to transport the air to an air heating device and an air cooling device fluidly coupled to the cargo compartment. Air may be supplied from an air source. Extracted air maybe discharged overboard. A temperature control system is operably coupled to the air heating device and the air cooling device, the control system being configured to maintain a predetermined air temperature within the compartment in response to a sensed compartment temperature.

6 Claims, 4 Drawing Sheets

SYSTEMS AND METHODS FOR CARGO COMPARTMENT AIR CONDITIONING USING RECIRCULATED AIR

FIELD OF THE INVENTION

This invention relates generally to environmental control systems in aircraft, and more particularly, to systems and methods for providing conditioned air to a selected portion of an aircraft cabin.

BACKGROUND OF THE INVENTION

Modern passenger transport aircraft typically operate at elevated altitudes in order to avoid weather and to obtain other significant advantages generally associated with high altitude flight. Accordingly, such aircraft are equipped with an environmental control system that provides pressurized and temperature controlled air to passengers within a cabin of the aircraft. Briefly and in general terms, the environmental control system typically extracts air at an elevated temperature and pressure from a compressor section of one or more of the engines of the aircraft, suitably conditions the extracted air and distributes the conditioned air to the cabin to provide a comfortable environment for the flight crew and passengers within the aircraft.

The suitably conditioned air is continuously supplied to various portions of the aircraft cabin through an air distribution system. Typically, the aircraft cabin includes a flight deck area that is occupied by a flight crew, a passenger compartment that is occupied by the passengers, and one or more cargo compartments that are occupied by cargo items, such as passenger luggage, freight items, or other like items. In general, the environmental control system provides air to the various portions of the aircraft cabin according to a predetermined air distribution plan. For example, the flight deck area may be provided with substantially outside air, while the passenger compartment receives a reduced volume of outside air that is mixed with recirculated and filtered air previously within the passenger compartment so that the resulting air mixture includes both outside air and highly filtered air portions. Typically, the mixture in the passenger cabin is continuously maintained at approximately about one-half outside air by volume. The cargo compartment receives air from various sources that may include outside air, or recirculated air. In some cases, the cargo compartment is not ventilated, so that it does not receive air. In any case, a selected volume of the air within the cargo compartment is released to the lower lobe cheek region and discharged from the aircraft through an outflow valve that is controllable by the environmental control system and/or discharged through other means, such as through cabin and/or cargo door leakage.

The air temperature within the flight deck and the passenger compartment are generally closely regulated to achieve a desired comfort level to the flight crew and the passengers. Accordingly, the flight deck and the passenger compartment generally include various temperature sensing devices positioned in flight deck and passenger compartments that are operable to control the system to admit additional cold air when additional cooling is desired, and to correspondingly add additional higher temperature air when additional heating is desired.

The air temperature within the cargo compartment is generally controllable within wider temperature ranges so that the cargo compartment may accommodate a variety of different cargo items. For example, when perishable cargo is contained within the cargo compartment, lower air temperatures are generally preferred, while somewhat warmer air temperatures are preferred when live cargo is transported within the cargo compartment.

One shortcoming associated with current environmental control systems is that they may provide only for the addition of heat into the cargo compartment by continuously moving air into the cargo compartment, or from the lower lobe cheek into the compartment. Alternately, air within the compartment may be moved through one or more electrical resistance heaters to provide additional heat to the cargo compartment. In still another method, hot outside air from the compressor section of one or more of the engines may be introduced into the compartment. Accordingly, removing heat from cargo compartment air is achievable only by passive means (e.g., by conducting heat through an outer skin of the aircraft). In order to attain better temperature control, conditioned air may be supplied to the cargo compartment from the cabin and/or flight deck supply systems. Since this approach generally increases the outside air requirement, fuel consumption is disadvantageously increased.

What is needed in the art is an environmental control system that permits air temperatures within a selected compartment, such as a cargo compartment, to be controlled in a manner that is energy efficient, avoids the addition of weight to the aircraft and that minimizes the outside air requirement.

SUMMARY OF THE INVENTION

The present invention comprises systems and methods for providing conditioned air to a selected portion of an aircraft cabin. In one aspect, a system for environmental control system for an aircraft cabin includes a cargo compartment air recirculation system fluidly coupled to the cargo compartment and having an air moving device operable to extract air from the compartment and to transport the air to an air heating device and an air cooling device fluidly coupled to the cargo compartment. A temperature control system is operably coupled to the air heating device and the air cooling device, the control system being configured to maintain a predetermined air temperature within the compartment in response to a sensed compartment temperature.

In another aspect, a cargo compartment recirculation system for an aircraft includes an air moving device fluidly coupled to the cargo compartment and operable to remove an air volume from the compartment, and an air heating device and an air cooling device fluidly coupled to the compartment. A recirculation duct is fluidly coupled to the air moving device and configured to selectively direct at least a portion of the volume to the air heater and the air cooler, and also a portion overboard. A temperature control system is operably coupled to the air heating device, the air cooling device, and to the recirculation duct, the system being configured to maintain a predetermined air temperature within the compartment.

In still another aspect, a method for controlling an air temperature in an aircraft cargo compartment includes selecting a set point temperature, and measuring a temperature within the compartment and comparing the measured temperature to the set point temperature to generate an error value. If the generated error value is positive and greater that a predetermined error criterion, a cooling portion of an air recirculation system fluidly coupled to the cargo compartment is activated to cool an air volume extracted from the compartment. If the generated error value is negative, a heating portion of the air recirculation system fluidly coupled to the cargo compartment is activated to heat the air volume extracted from the compartment.

In still yet another aspect, an aerospace vehicle includes a fuselage enclosing an aircraft cabin having at least one cargo compartment, and a cargo compartment air recirculation system positioned within the fuselage. The system further includes an air moving device fluidly coupled to the cargo compartment and operable to extract air from the compartment and to transport the air to an air heating device and an air cooling device that are fluidly coupled to the cargo compartment. A temperature control system is operably coupled to the air heating device and the air cooling device so that the temperature control system maintains a predetermined air temperature within the compartment in response to a sensed compartment temperature.

BRIEF DESCRIPTION OF THE DRAWINGS

Preferred and alternate embodiments of the present invention are described in detail below with reference to the following drawings.

DETAILED DESCRIPTION OF THE INVENTION

The present invention relates to systems and methods for providing conditioned air to a selected portion of an aircraft cabin, such as a cargo compartment. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

Figure 1:
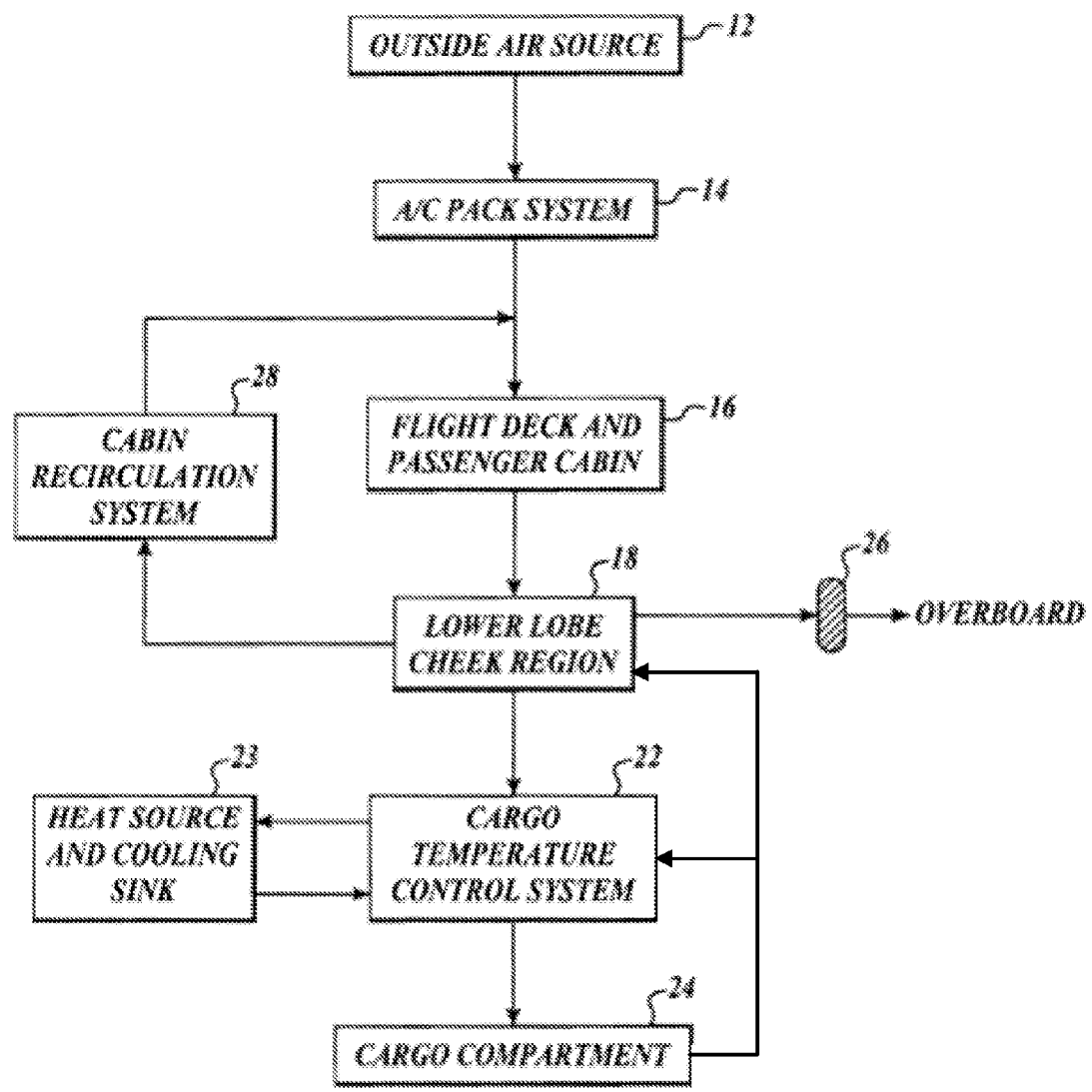
FIG. 1 is a diagrammatic block view of an environmental control system for an aircraft, according to an embodiment of the invention.

FIG. 1 is a diagrammatic block view of an environmental control system 10 for an aircraft, according to an embodiment of the invention. The environmental control system 10 includes an outside air source 12 coupled to the aircraft. One source may be a bleed air system that extracts air at an elevated temperature and pressure from a compressor section of a propulsion unit. Alternately, the outside air may be provided by other sources. For example, the outside air may be supplied by an Auxiliary Power Unit (APU), or other compression devices positioned within the aircraft, or from still other sources, such as an external compressed air supply. The outside air system 12 may include a heat exchanger that at least partially transfers the heat of compression to an air stream surrounding the aircraft or other suitable waste heat removal medium. The outside air system 12 is fluidly coupled to an air conditioning (A/C) pack system 14 that receives the extracted air (or outside air) from the outside air system 12 and suitably conditions the outside air to generate air having a desired temperature and pressure that may be admitted to the flight deck and passenger cabin 16. Accordingly, the A/C pack system 14 generally includes one or more air cycle machines (not shown in FIG. 1) operable to provide air to the cabin 16 through a series of controlled compressions and expansions of the outside air. The A/C pack system 14 may also include various other known devices that remove moisture from the outside air, and is further configured to control the operation of the air cycle machines so that the temperature and pressure within the cabin 16 is suitably controlled. Although FIG. 1 shows the A/C pack system 14 coupled to the outside air system 12, it is understood that the A/C pack system 14 may also receive air at an elevated temperature and pressure from an auxiliary power unit (APU) that typically provides compressed air and electrical power to the aircraft while the aircraft is on the ground.

Still referring to FIG. 1, the aircraft cabin 16 may be subdivided into a plurality of discrete temperature zones, such as a flight deck and a passenger compartment. Temperature sensors (also not shown in FIG. 1) may be positioned in the flight deck and the passenger compartment that communicate with the A/C pack system in order to provide a closed feedback control loop. The cabin 16 is fluidly coupled to a recirculation system 28 that is operable to remove air at a predetermined rate and to subject the removed air to a highly effective air filtration process. The filtered air is then returned to the cabin 16 and combined with a predetermined volume of outside air obtained from the A/C pack system 14. The aircraft cabin 16 is fluidly coupled to a lower lobe cheek region 18 and a cargo compartment 24. The compartment 24 may be a single compartment, or further subdivided into two or more mutually isolated compartments that are generally configured to receive passenger luggage, or other cargo items. The cargo compartment 24 receives air discharged from the cabin 16, and the lower lobe cheek region 18. One or more cabin outflow valves 26 in fluid communication with the cargo compartment 24 selectively release air from the compartment 24 in order to offset the air supplied to the cargo compartment 24 to ensure that cargo compartment odors do not migrate into the cabin or into the recirculation system. Accordingly, the rate of release is generally greater than the rate of supply.

The system 10 also includes a cargo temperature control system 22 that is operable to control a temperature in the cargo compartment 24 by selectively heating and/or cooling the cargo compartment air. Accordingly, the air may be selectively routed to a heat source and cooling sink 23. The air thus routed may be heated by various methods, including heating the air with electrical resistance heaters, by admitting an amount of relatively high temperature air from the outside air system 12 ("trim air"), or by routing the removed air through one side of a heat exchanger, and routing a higher temperature fluid through an opposing side of the heat exchanger. In one embodiment, the higher temperature fluid is a relatively high temperature liquid obtained from an equipment cooling system. Alternately, when it is desired to cool the cargo supply air, the air may be selectively routed to a cooling portion of the system 23. Accordingly, the air may be routed through one side of a heat exchanger, while an opposing side of the heat exchanger receives a relatively low temperature fluid such as low temperature air obtained from an expansion stage of the air cycle machine, or from a dedicated liquid coolant loop (or refrigeration loop) that is operable to receive heat from the removed air in the heat exchanger and that rejects the heat to a relatively low temperature sink, such as the low temperature air stream external to the aircraft. In another specific embodiment, the dedicated coolant loop is a refrigeration cycle that uses a known refrigerant fluid.

The cargo compartment temperature control system 22 also includes a temperature control system that is operable to controllably adjust the temperature in the cargo compartment 24 by measuring a temperature in the compartment 24 and comparing the measured temperature to a set point value that reflects a desired temperature for the compartment 24. The temperature control system controllably adjusts the temperature by controlling valves that selectively route the removed air to the heating and cooling portions of the system 22. Control is thus achieved through a combination of control of a heat sink and/or source and control of cargo recirculation and the supply upstream of the air inlet valve 52.

Figure 2:
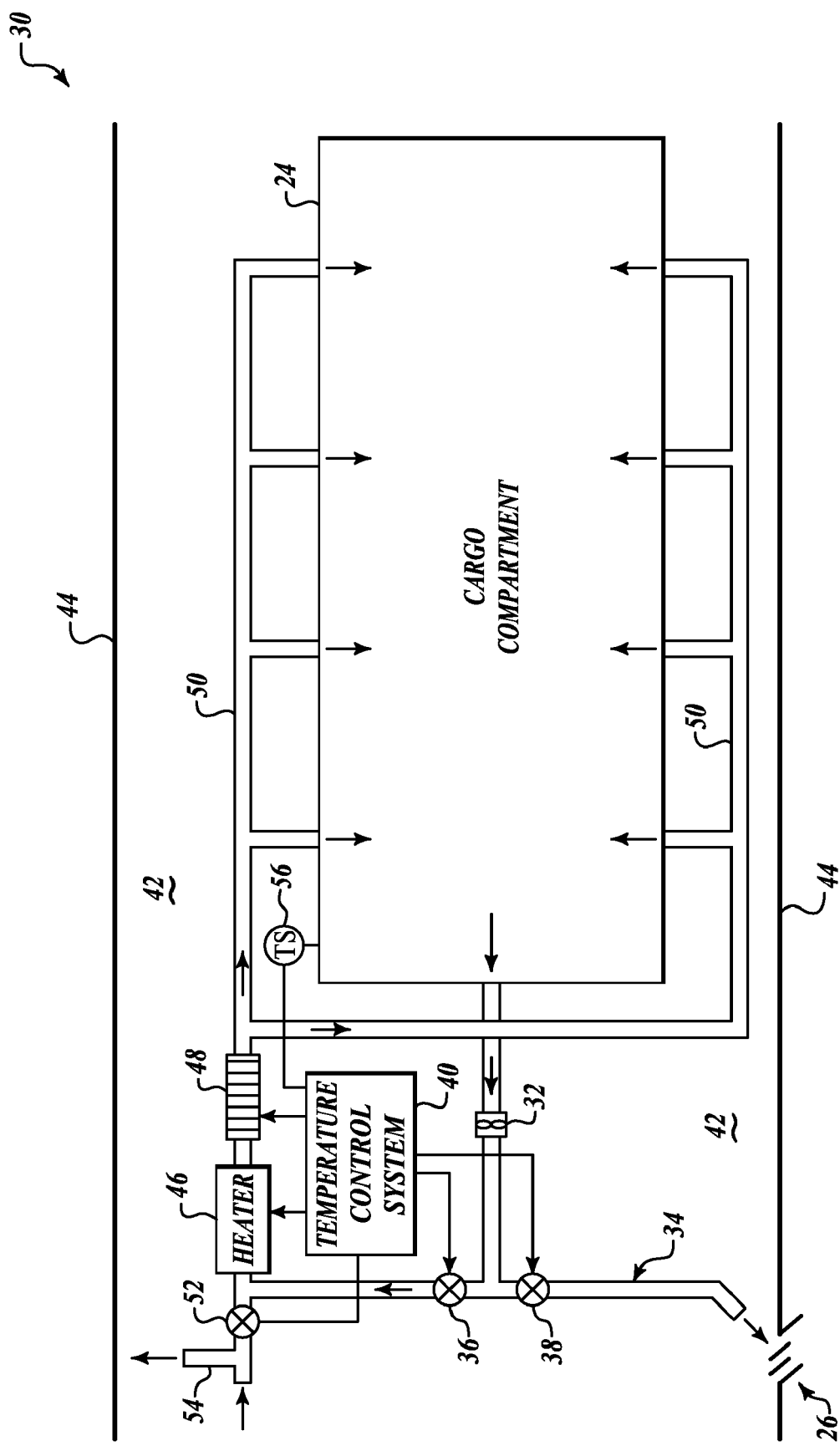
FIG. 2 is a partial schematic view of a cargo compartment recirculation system 30 according to still another embodiment of the invention.

FIG. 2 is a partial schematic view of a cargo compartment recirculation system 30 according to still another embodiment of the invention. Air is removed from the cargo compartment 24 by an air moving device 32 and is directed into a recirculation duct 34 that includes a recirculation valve 36 and a discharge valve 38. The recirculation valve 36 and the discharge valve 38 are controlled by a temperature control system 40 to achieve a desired air recirculation rate and air discharge rate, respectively. The temperature control system 40 will be discussed in greater detail below. If air is discharged by the system 30, the recirculation duct 34 directs the air to an outer (or cheek) region 42 of the aircraft, whereupon the air may then be discharged through a fuselage skin 44 of the aircraft by the cabin outflow valve 26. Alternately, if air is recirculated by the system 30, the recirculation duct 34 directs the air to an air heater 46 to selectively provide heat to the recirculated air, and further to an air cooler 48 to selectively remove heat from the recirculated air. The air heater 46 and the air cooler 48 are coupled to the temperature control system 40 so that the heating and cooling processes may be controlled. Accordingly, the temperature control system 40 may interruptably provide an electrical current to an electrical resistance heating element, or it may selectively admit high temperature air through a trim air valve, or to a heat exchanger, as previously described. When it is desired to cool the recirculated air, the temperature control system 40 may control the operation of the air cooler 48 by selectively admitting a relatively low temperature fluid to a heat exchanger, as previously described. The recirculated air is then returned to the cargo compartment 24 through a distribution duct 50 that fluidly communicates with the cargo compartment 24 through one or more outlets that extend through a wall of the cargo compartment 24, or by other means that permit the recirculated air to be returned to the compartment 24.

The cargo compartment recirculation system 30 also includes an inlet valve 52 that is coupled to the temperature control system 40 and configured to receive air from the cheek region 42, or other aircraft systems, such as the A/C pack system 14 (FIG. 1), the E/E cooling system 14 (FIG. 1) or other systems. In a particular embodiment, the inlet valve 52 is configured to admit air that is discharged from an electrical/electronics (E/E) compartment in the aircraft. The air discharged from the (E/E) compartment is accordingly heated by the equipment positioned in the compartment, which may be advantageously used to provide additional heating to the cargo compartment 24 when required. Alternately, when the additional heating is not desired, the inlet valve 52 may be positioned at least partially in a closed position so that inlet air supplied to the valve 52 may be discharged into the cheek region 42 through a discharge duct 54, rather than into the compartment 24.

The temperature control system 40 is further coupled to one or more thermal sensors 56 that are operable to sense an air temperature within the cargo compartment 24. Accordingly, the sensors 56 may comprise any known temperature sensing device, such as a thermocouple, a thermopile, a thermistor, or other suitable temperature sensing devices. The temperature control system 40 thus measures an air temperature and compares the air temperature to a desired set point temperature that is provided to the system 40 by a flight crewmember, or otherwise provided to the system 40 by others. The system 40 thus generates an error signal that is proportional to a difference between the measured air temperature within the cargo compartment 24 and the set point temperature, and controls the operation of the air heater 46, the air cooler 48, and the position of the recirculation valve 36, the discharge valve 38, and the inlet valve 52 to minimize a magnitude of the error signal. The temperature control system 40 may thus employ a proportional control algorithm. Alternately, in other embodiments, the temperature control system 40 may employ a proportional-integral (P-I), or a proportional-integral-differential (P-I-D) control algorithm.

Figure 3:
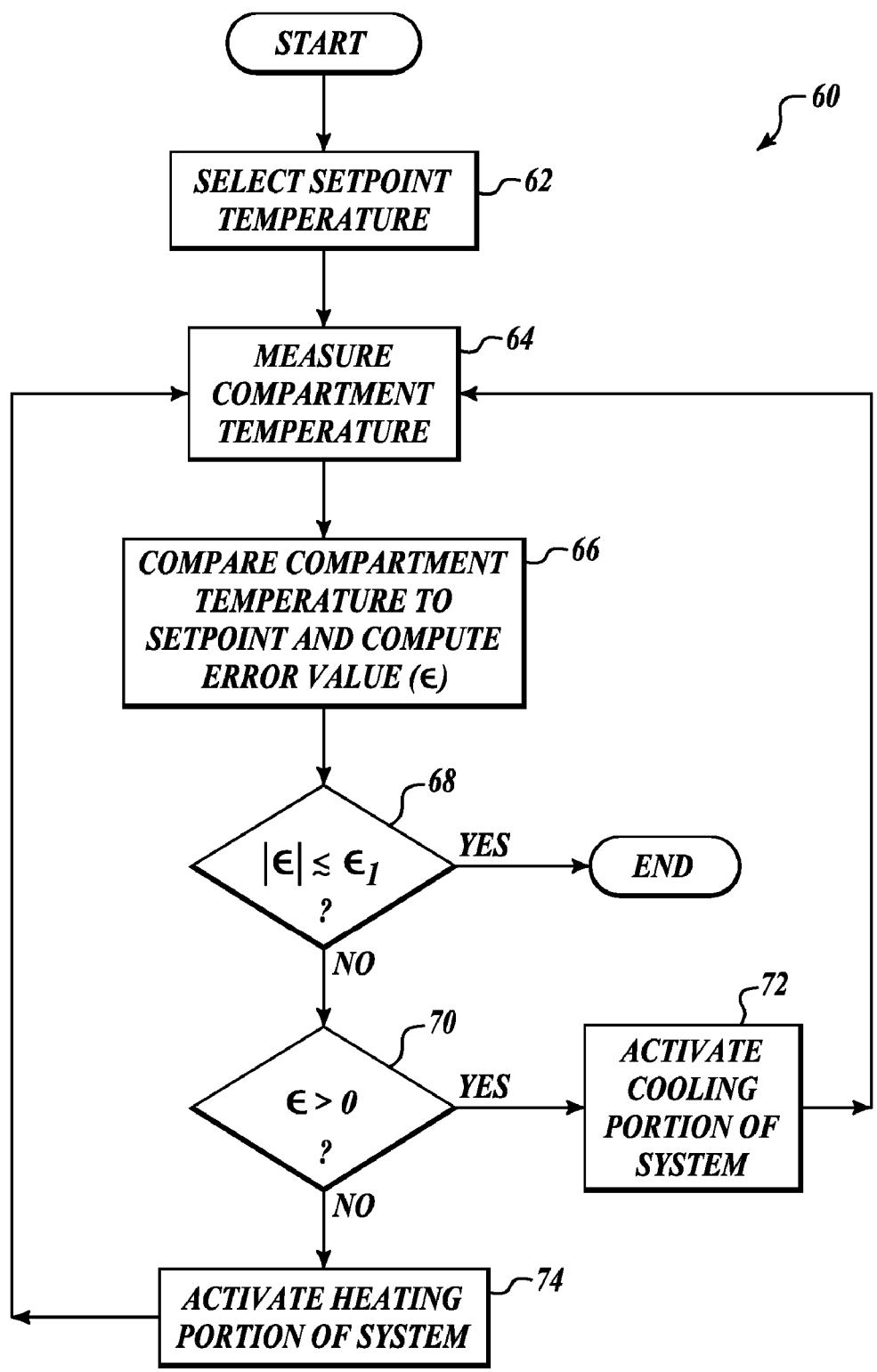
FIG. 3 is a block diagram of a method for controlling an air temperature in an aircraft compartment according to still yet another embodiment of the invention.

FIG. 3 is a block diagram of a method 60 for controlling an air temperature in an aircraft compartment, according to still another embodiment of the invention. At block 62, a set point temperature is selected. The flight crew, for example, may select the set point temperature so that an appropriate compartment temperature is specified for the compartment. As noted earlier, it may be desired to maintain a lower cargo compartment temperature when perishable cargo is carried within the compartment, while a higher cargo compartment temperature may be desired when live cargo is carried within the compartment. At block 64, the cargo compartment temperature is measured. The temperature may be measured at a single selected location within the compartment, or it may be a suitably averaged temperature that is obtained from a plurality of temperature sensors positioned at selected locations within the compartment. At block 66, the measured temperature is compared to the set point value, and an error value $\epsilon$ is computed based upon a difference between the measured temperature and the set point. At block 68, if an absolute value of the generated error value is less than a predetermined error criterion $\epsilon_1$, the method 60 terminates, since the compartment has achieved the selected set point temperature. If the absolute value of the generated error value is not less than the predetermined error criterion $\epsilon_1$, then at a block 70, the method 60 determines whether the generated error value is less than the setpoint. If the generated error value is positive, as shown at block 70, the temperature is greater than the set point temperature, and the compartment requires additional cooling. Accordingly, a cooling portion of the system 28 (FIG. 1) is activated at block 74 to provide the additional cooling to the compartment. The method 60 then recursively returns to block 64, and the cooling continues until the computed error converges to the predetermined error criterion. Otherwise, the error value $\epsilon$ is negative and the compartment temperature is less than the set point value, so that a heating portion of the system 28 (FIG. 1) is activated at block 72. Block 72 then recursively returns to block 64, and the heating continues until the error converges to the error criterion.

Figure 4:
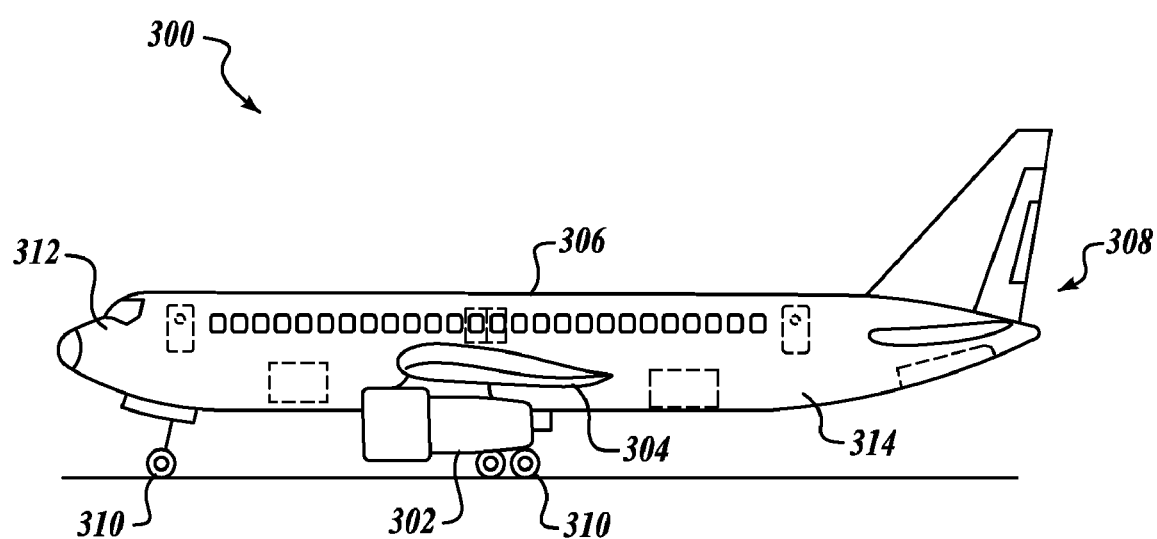
FIG. 4 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 4, a side elevation view of an aircraft 300 having one or more of the disclosed embodiments of the present invention is shown. With the exception of the embodiments according to the present invention, the aircraft 300 includes components and subsystems generally known in the pertinent art. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes a flight control system 312 (not shown in FIG. 4), as well as a plurality of other electrical, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 4 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK. In addition, various embodiments of the present invention may also be incorporated into other transportation vehicles, including passenger railroad cars of various types, passenger buses, or other similar terrestrial vehicles.

With reference still to FIG. 4, the aircraft 300 may include one or more of the embodiments of the environmental control system 314 according to the present invention, which may operate in association with the various systems and subsystems of the aircraft 300. The environmental control system 314 may be configured to control an air temperature within a cargo compartment of the aircraft 300, as previously discussed in detail. The system 314 may, however, be used to controllably regulate an air temperature in other selected compartments, such as a main cargo deck in a cargo aircraft, or a cargo portion of an aircraft operated in a combi configuration.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for controlling air temperature in a cargo compartment of an aircraft, the aircraft also including a cabin, the method comprising:
    mixing at least some air discharged from the aircraft cabin with air removed from the cargo compartment; and
    supplying the mixture only to the cargo compartment.

2. The method of claim 1, wherein at least some discharged cabin air is routed to an aircraft cheek, and wherein at least some air from the cheek is mixed with the air removed from the compartment.

3. The method of claim 1, wherein avionics waste heat is used to heat the mixture before the mixture enters the cargo compartment.

4. The method of claim 1, wherein a dedicated cooler is used to cool the mixture before the mixture enters the cargo compartment.

5. The method of claim 4, wherein the dedicated cooler includes a fluid cooling loop coupled to a cooling source.

6. The method of claim 1, wherein a resistance heating device is used to heat the mixture before the mixture enters the cargo compartment.

\* \* \* \* \*